United States Patent
Howcroft

(10) Patent No.: US 8,626,898 B2
(45) Date of Patent: Jan. 7, 2014

(54) SYSTEM AND METHOD FOR APPLICATION ALERT TRACKING IN AN INTERNET PROTOCOL TELEVISION SYSTEM

(75) Inventor: Jerald R. Howcroft, Beverly Hills, MI (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 674 days.

(21) Appl. No.: 12/640,665

(22) Filed: Dec. 17, 2009

(65) Prior Publication Data

US 2011/0153749 A1 Jun. 23, 2011

(51) Int. Cl.
*G06F 15/16* (2006.01)

(52) U.S. Cl.
USPC .......................................... 709/224; 709/206

(58) Field of Classification Search
USPC ................................................. 709/206, 224
See application file for complete search history.

(56) References Cited

U.S. PATENT DOCUMENTS

| | | | |
|---|---|---|---|
| 6,345,288 B1 | 2/2002 | Reed et al. | |
| 6,957,199 B1 | 10/2005 | Fisher | |
| 7,254,645 B2 | 8/2007 | Nishi | |
| 7,437,446 B2 | 10/2008 | Bailey et al. | |
| 2006/0004830 A1* | 1/2006 | Lora et al. | 707/102 |
| 2007/0106768 A1* | 5/2007 | Frietsch et al. | 709/223 |
| 2008/0155564 A1* | 6/2008 | Shcherbina et al. | 719/318 |
| 2009/0158096 A1* | 6/2009 | Ali et al. | 714/43 |
| 2009/0161530 A1* | 6/2009 | Yang et al. | 370/216 |
| 2011/0045841 A1* | 2/2011 | Kuhlke et al. | 455/456.1 |
| 2011/0141921 A1* | 6/2011 | Reese et al. | 370/252 |

* cited by examiner

*Primary Examiner* — Tauqir Hussain
*Assistant Examiner* — Ebrahim Golabbakhsh
(74) *Attorney, Agent, or Firm* — Guntin & Gust, PLC; Douglas Schnabel

(57) ABSTRACT

A maintenance system for an IPTV network includes a logging module, a ticketing module, and an operations module. The logging module receives a fault alert from a service provider and sends the alert to the ticketing module. The ticketing module determines the urgency of the fault, generates a ticket, assigns priority to the ticket based upon the urgency, and sends the ticket to the operations module. The operations module allocates the ticket and sends a message to a mobile device regarding the ticket. A method includes receiving a fault alert from a service provider, sending the alert to a ticketing module, determining the urgency of the event, generating a ticket, assigning priority to the ticket based upon the urgency, sending the ticket to an operations module, allocating the ticket, and sending a message to a mobile device the ticket.

17 Claims, 4 Drawing Sheets

SYSTEM AND METHOD FOR APPLICATION ALERT TRACKING IN AN INTERNET PROTOCOL TELEVISION SYSTEM

FIELD OF THE DISCLOSURE

The present disclosure generally relates to an Internet protocol television system, and more particularly relates to application alert tracking in an Internet protocol television system.

BACKGROUND

An Internet protocol television (IPTV) service provider can transmit an IPTV signal to a user of the IPTV system via a central office, a serving area interface, and a residential gateway. The IPTV service provider can offer the user a variety of different content and services. For example, the IPTV service provider can supply users with real-time television programs that are typically available for the users to watch only at a specific date and time, or on-demand movies that are available for an extended amount of time and that are provided to the users upon request of the on-demand movie. The IPTV service provider can also supply users with service applications that enhance the users' enjoyment of the IPTV service. Third parties can source content and services to the IPTV service provider.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
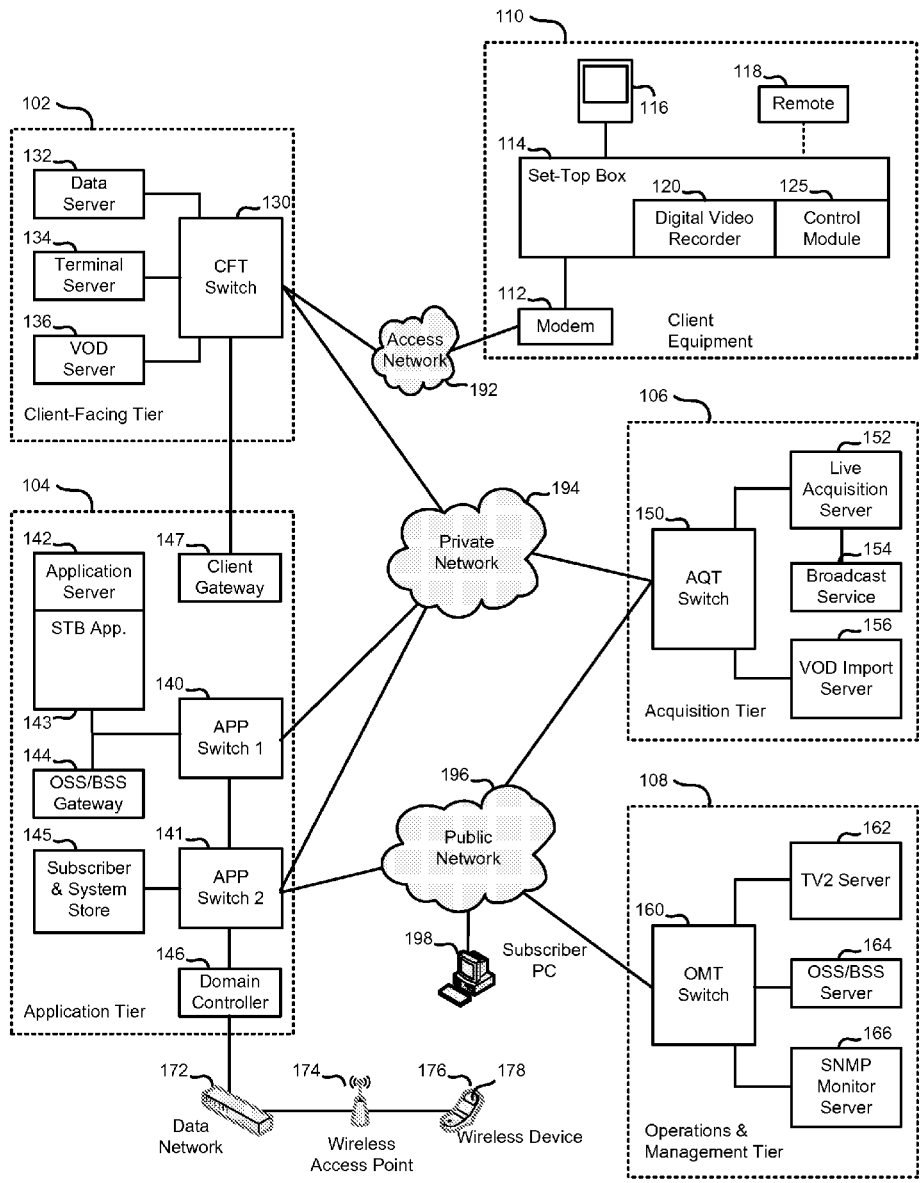
FIG. 1 is a block diagram illustrating an embodiment of an IPTV system.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194 and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television programs, audio files, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a display device 116, and a remote control 118. The set-top box 114 includes a digital video recorder (DVR) 120 and a control module 125. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another network fabric, or any combination thereof.

The information that CF tier 102 communicates to modem 112 is sent to set-top box 114, which processes the information into a form suitable for display by display device 116 or for recording by DVR 120. Set-top box 114 receives digitally encoded content from CF tier 102 for display on display device 116, or for recording by DVR 120. Set-top box 114 can also receive data from CF tier 102, and render or display the data on display device 116. Further, set-top box 114 can send data to CF tier 102. Such data can include service requests, or commands from the subscriber, received by set-top box 112 via remote control 118. For example, control module 125 can include a remote control interface module (not illustrated) for receiving inputs to set-top box 112 from remote control 118. In this way, the subscriber can request services or information or respond to a request for information from IPTV system 100. Control module 125 includes instructions that are executable by set-top box 114 to control the data flow between the subscriber and IPTV system 100. Control module 125 can include an IPTV software platform such as Microsoft® TV IPTV Edition.

Control module 125 can facilitate data communication between set-top box 114 and IPTV system 100. For example, control module 125 can include a procedure whereby set-top box 114 receives a request to record content on DVR 120, or sends a status to IPTV system 100 that the content has been recorded. Likewise, control module 125 can include a procedure whereby the subscriber can interact with IPTV system 100 to receive and execute a viewing preference that the subscriber has created in IPTV system 100. Such preferences can be created via remote control 118, or through a subscriber account that is accessible through public network 196, such as through a subscriber's personal computer 198. A non-limiting example of remote control 118 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes application tier (APP) switches 140 and 141, an application server 142, an operation systems and support/billing systems and support (OSS/BSS) server 144, a subscriber and system store 145, a domain controller 146, and a client gateway 147. APP switches 140 and 141 manage communication with CF tier 102 and acquisition tier 106 through private network 194. APP switch 141 also manages communication with acquisition tier 106 and OM tier 108 through public network 196. APP switch 140 is coupled to APP switch 141. APP switch 140 is also coupled to application server 142 and to OSS/BSS gateway 144. Application server 142 provides applications to set-top box 114 through a set-top box application 143, so that set-top box 114 can provide functions such as recording and displaying content, messaging, and processing of IPTV data and VOD material. OSS/BSS gateway 144 includes operation systems and support (OSS) data, and billing systems and support (BSS) data.

APP switch 141 is coupled to domain controller 146 and to subscriber and system store 145. Domain controller 146 provides web access, for example, to subscribers via public network 196. Subscriber and system store 145 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192, and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, APP switch 140, and APP switch 141. Further, client gateway 147 verifies billing information and status by communicating with OSS/BSS gateway 144 via private network 194 and APP switch 140. OSS/BSS gateway 144 transmits a query across APP switch 140, to APP switch 141, and APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

Acquisition tier 106 includes an acquisition tier (AQT) switch 150, a live acquisition server 152, a broadcast service 154, and a video-on-demand importer server 156. AQT switch 150 manages communication with CF tier 104 and application tier 104 through private network 194, and with application tier 104 and OM tier 108 through public network 196. AQT switch 150 is coupled to live acquisition server 152, and video-on-demand importer server 156. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the information to display device 116 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 118, the request is transmitted over access network 192 to VOD server 136 via CFT switch 130. Upon receiving such a request, VOD server 136 retrieves the requested VOD content and transmits the content to set-top box or 114 across access network 192 via CFT switch 130.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Figure 2:
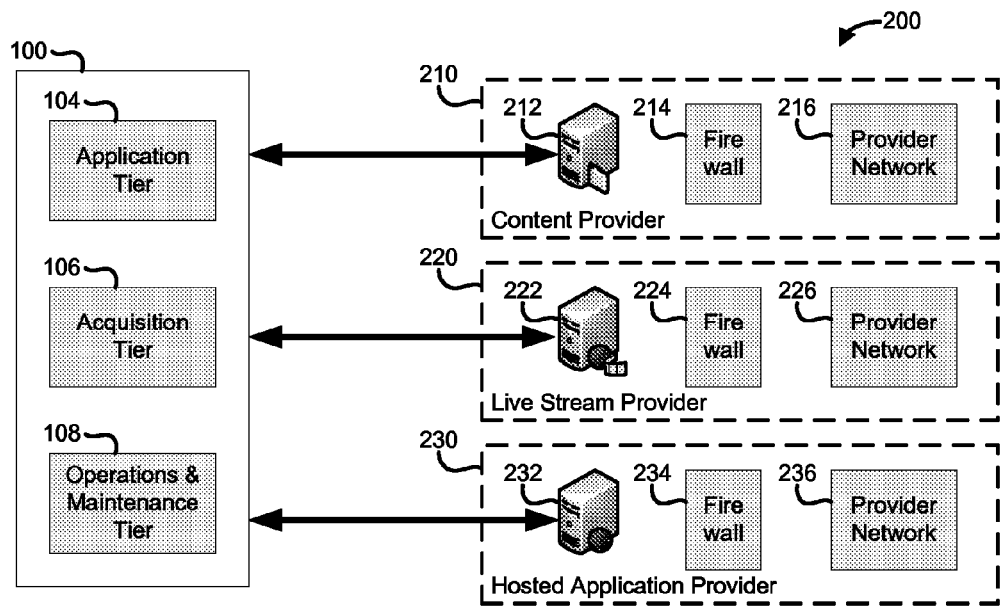
FIG. 2 is an illustration of a system for processing third party content and service provisioning for the IPTV system of FIG. 1.

FIG. 2 shows third party content and service providers 200 for IPTV system 100. Content and service providers 200 include a content provider 210, a live stream provider 220, and a hosted application provider 230. Content provider 210 includes an interface system 212, a firewall 214, and a provider network 216. Live stream provider 220 includes an interface system 222, a firewall 224, and provider network 226. Hosted application provider 230 includes an interface system 232, a firewall 234, and provider network 236. IPTV system 100 is illustrated as including application tier 104, acquisition tier 106, and operations and maintenance tier 108. In a particular embodiment, providers 210, 220, and 230 are connected to one or more of application tier 104, acquisition tier 106, and operations and maintenance tier 108 to provide the associated content and receive requests or status and maintenance information. In another embodiment (not illustrated), providers 210, 220, and 230 are also connected to client-facing tier 102 or to client equipment 110 to provide content or other status and maintenance information to IPTV system 100.

Content provider 210 is connected to IPTV system 100 through interface system 212 to provide content to IPTV system 100, to receive requests for content, and to exchange status event and alert information with IPTV system 100. For example content provider 210 can be connected via a primary link (not illustrated) to acquisition tier 106 to provide content to IPTV system 100, and content provider 210 can be connected via a secondary link (not illustrated) to operations and maintenance tier 108 to receive a request from IPTV system 100 for the content or to share status event and alert information. In a particular embodiment, the content provided by content provider 210 is pushed to IPTV system 100 at a predetermined time interval. For example, content provider 210 can represent a premium content channel such as Home Box Office, Starz, another premium content channel, or a combination thereof. Here, content provider 210 can distribute content to IPTV system 100 in advance of a programmed viewing interval, such as for a day of programming, at some time prior to the programmed day. In another embodiment, IPTV system 100 makes a request to content provider 210 for content. Thus, for example, content provider 210 can represent a source of on-demand content.

Live stream provider 220 is connected to IPTV system 100 through interface system 222 to provide live content streams to IPTV system 100 and to exchange status event and alert information with IPTV system 100. For example live stream provider 220 can be connected via a primary link (not illustrated) to acquisition tier 106 to provide streaming content to IPTV system 100, and via a secondary link (not illustrated) to operations and maintenance tier 108 to share status event and alert information. For example, live stream provider 220 can represent a local network affiliate that can distribute live content to IPTV system 100 such as live newscasts or sporting events.

Hosted application provider 230 is connected to IPTV system 100 through interface system 232 to provide applications and services to IPTV system 100, to receive requests for the applications and services, and to exchange status event and alert information with IPTV system 100. For example hosted application provider 230 can be connected via a primary link (not illustrated) to application tier 104 to provide applications and services to IPTV system 100, and can be connected via a secondary link (not illustrated) to operations and maintenance tier 108 to receive requests for the applications and services or status event and alert information. In a non-limiting example, hosted application provider 230 provides Internet based services, music applications, traffic information, other applications and services, or a combination thereof.

In operation, interface systems 212, 222, and 232 provide interfaces between IPTV system 100 and providers 210, 220, and 230, respectively. Interface systems 212, 222, and 232 are maintained and managed by the respective providers 210, 220, and 230, and include status event and alert hooks that are used by IPTV system 100. Providers 210, 220, and 230 each maintain their respective firewalls 214, 224, and 234 in front of provider networks 216, 226, and 236. The status event and alert hooks provide a mechanism whereby problems with provider networks 216, 226, and 236 are identified to IPTV system 100, or problems with IPTV system 100 in receiving content from providers 210, 220, or 230 are identified to the affected provider 210, 220, or 230.

Table 1 illustrates an example of status events and alerts that can be provided by interface systems 212, 222, and 232. Various events are listed in the first column. The events may relate to a video content system, as listed in the second column, or to a backend system as listed in the third column. A threshold level can be associated with each event that defines when an alert is sent to IPTV system 100, as listed in the fourth column. The threshold can be defined by the presence of a condition, indicated as "If YES" in the threshold column. For example, the event labeled "Server Down (cold/warm boot) can generate an alert if a server in either the video system or the backend system is not operational. The threshold can also be defined by a percent level or an absolute level, indicated as ">80%" or ">N" in the threshold column. For example, the event labeled "Server CPU Utilization" can generate an alert if a server in either the video system or the backend system exceeds 80% CPU utilization, or the event labeled "Server Excess Process" can generate an alert if a server in either the video system or the backend system is running more than "N" processes.

TABLE 1

Third Party Events

| Event | Video System | Backend System | Threshold |
| --- | --- | --- | --- |
| Server Down (cold/warm boot) | X | X | If YES |
| Server CPU Utilization | X | X | >80% |
| Server RAM Utilization | X | X | >80% |
| Server HDD Utilization | X | X | >80% |
| Server High Temperature | X | X | If YES |
| Server Fan Failure | X | X | If YES |
| Server Software Error (OS, | X | X | If YES |
| Server Excess Process | X | X | >N |
| Network Link Down | X | X | If YES |
| Network Node Down | X | X | If YES |
| DNS Error | X | X | If YES |
| Database Read/Write Error | N/A | X | If YES |
| File System Outage | X | X | If YES |
| Source Media Streaming Error | X | N/A | If YES |
| Authentication Failure | X | X | If YES |
| Application Custom Event | X | X | If YES |

Providers 210, 220, and 230 can also provide alerts for custom events, as indicated in the row labeled "Application Custom Event." In a particular embodiment, hosted application provider 230 can operate an interactive television application where clients of IPTV system 100 can interact with a set-top box to receive the application's content. For example, a provider can operate a "Santa Tracker" channel during the Christmas season, a fantasy sports channel during the regular season for the sport, a stock trading channel, another type of interactive application, or a combination thereof. Screens associated with the application can include text, still and video images, music, or other media information. Custom events associated with an application can generate alerts for errors in retrieving, loading, or displaying the media information. Screens can also include interactive content, and custom events can generate alerts for errors in sending information to the provider or in receiving results from the provider.

Figure 3:
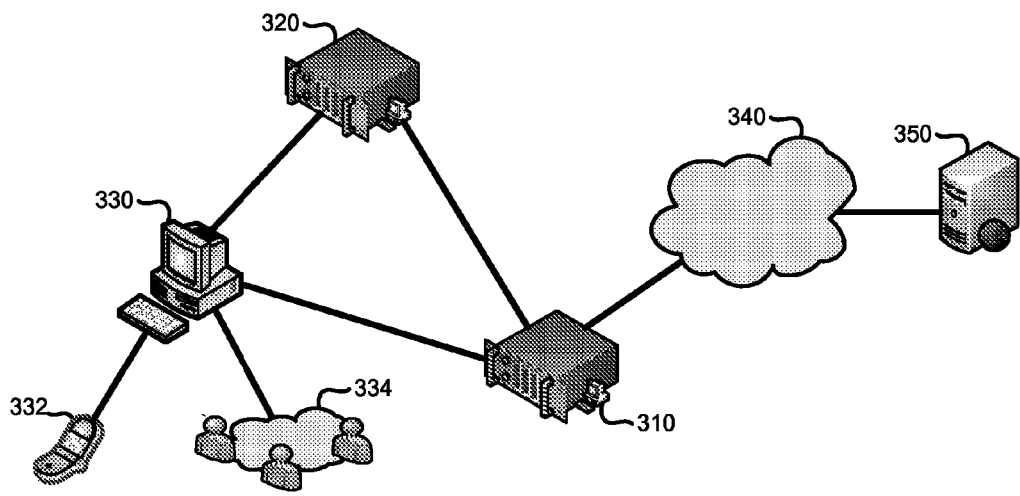
FIG. 3 is an illustration of a maintenance network in the IPTV system of FIG. 1.

FIG. 3 illustrates a maintenance system 300 for managing status events and alerts in IPTV system 100. Maintenance system 300 includes an alert logger module 310, a ticketing module 320, an operations module 330, a mobile device interface module 332, a social network interface module 334, a network 340, and one or more provider alert modules 350. Alert logger module 310 is connected to ticket generating module 320, to operations module 330, and to network 340. Ticketing module 320 is also connected to operations module 330. Operations module 330 is also connected to mobile device interface module 332, and to social network interface module 334. Network 340 is also connected to provider alert module 350. Alert logger module 310, ticketing module 320, operations module 330, mobile device interface module 332, social network interface module 334, and provider alert module 350 can be implemented in hardware, software, or any combination thereof. Each module may include one or more computer systems. When a module includes more than one computer system, the functions of the module can be distributed across the multiple computer systems in a symmetric manner, where each computer system performs the same type of tasks, or in an asymmetric manner, where two computer systems of the module may perform different tasks.

Alert logger module 310 receives event alerts for IPTV system 100. The alerts include internal events generated by the elements of IPTV system 100, and external events generated by provider alert module 350. In a particular embodiment, the elements of IPTV system 100 and provider alert module 350 include an event agent (not illustrated) that monitors for alerts generated by the associated element or module. Upon occurrence of an event, the agent sends the alert to alert logger module 310. In another embodiment, the elements of IPTV system 100 and provider alert module 350 include an event log (not illustrated) that logs the alerts generated by the associated element or module. Then, alert logger module 310 periodically requests the alert logs from the elements of IPTV system 100 and from provider alert module 350. A non-limiting example of an alert logger module 310 includes a server running Microsoft System Center Operations Manager (SCOM) software, Linux or Unix alert logging software, Mac OS alert logging software, another alert logging software, or a combination thereof.

Alert logger module 310 sends information related to some or all of the logged alerts to ticketing module 320 and to operations module 330. As such, alert logger module 310 can function to filter the alerts received from the elements of IPTV system 100 and from provider alert module 350, determine that certain alerts relate to routine matters in IPTV system 100, and that other alerts relate to problems in IPTV system 100. Thus alert logger module 310 can send the information related to problems in IPTV system 100 to ticketing module 320 and to operations module 330, and not send the information related to routine matters in IPTV system 100. For example, alert logger module 310 can receive an alert every time a packet is dropped in IPTV system 100. Below a predetermined level of dropped packets in IPTV system 100, the alerts can be deemed to be routine. However, if more packets are dropped in IPTV system 100 than the predetermined level, then alert logger module 310 can send summary information related to the number and character of the dropped packets to ticketing module 320 and to operations module 330.

Ticketing module 320 receives the information from alert logger module 310 and automatically generates work tickets (not illustrated) based upon the alert information. As such, ticketing module 320 applies business rules to the received alert information to determine an urgency for the events associated with the alerts, and to prioritize the work tickets based upon the urgency of the events. For example, alert information indicating an excessive number of dropped packets in IPTV network 100 can be deemed less urgent than a link failure between IPTV system 100 and one or more of providers 210, 220, or 230. Thus ticketing module 320 can give the ticket associated with the link failure a higher priority than the ticket associated with the excessive number of dropped packets. Ticketing module 320 also includes a correlation engine (not shown) to determine if two or more of the alerts received from alert logger module 310 correlate to indicate a problem that may not otherwise be indicated by the presence of the individual alerts, and to generate a work ticket based upon the correlation. For example, a lone alert indicating that set-top box 114 failed to receive content for a particular application can generate a ticket to repair set-top box 114, and a lone alert indicating that set-top box application 143 failed to receive an acknowledgement of receipt of the content from set-top box application 143 can generate a ticket to repair set-top box application 143. However, these alerts taken together can generate a ticket to repair switches 130 and 140 that transport the content between set-top box application 143 and set-top box 114.

Operations module 330 receives the work tickets from ticketing module 320 and automatically allocates resources to dispose of the work tickets. As such, operations module 330 can represent a service and repair system in an operations department of IPTV system 100. Disposing of the work tickets involves assigning the work tickets to one or more operations technicians that evaluate the work ticket, determine a root cause for the event, and repair the problem at the root cause of the event. As such, operations module 330 operates to determine if a particular operations technician is available to work on a work ticket. Upon determining that the particular operations technician is available, operations module 330 sends a text message or a voice mail to mobile device module 332 for distribution to a mobile device (not illustrated) associated with the particular operations technician. Operations module 330 also posts a description of the work ticket to social network interface module 334 for posting on a public or a proprietary operations department social network (not illustrated), and sends a message to the particular operations technician's account on the operations department social network. Operations module 330 also has access to the alerts logged in alert logger module 310 in order to identify new business rules and correlations to implement in ticketing module 320.

Provider alert module 350 generates alerts based upon the occurrence of events within service providers 200. In a particular embodiment, provider alert module 350 generates alerts for providers 210, 220, and 230 based upon the events associated with the content, applications, and services from providers 210, 220, and 230. In another embodiment, one or more provider alert modules 350 is associated with each of providers 210, 220, and 230. When an event occurs, provider alert module 350 sends an alert to alert logger module 310 through network 340. An example of network 340 includes the Internet, a proprietary network established by the operator of IPTV system 100 for providing secure communication of alerts, another network, or a combination thereof. In this way, alerts from service providers 200 are communicated to maintenance system 300 for logging, ticketing, and disposition by event logger module 310, ticketing module 320, and operations module 330, respectively.

In another embodiment (not illustrated), ticketing module 320 is connected to network 340, and alerts from provider alert module 350 are also sent to ticketing module 320. In this embodiment, provider alert modules 350 has an event agent that includes the ability to filter the alerts such that routine alerts are not sent to ticketing module 320. In another embodiment (not illustrated), operations module 330 is connected to network 340. Here, operations module 330 includes an operations interface module that permits alerts generated from provider alert module 350 to be sent to a particular operations technician's mobile device through mobile device interface module 332, or to the operations technician's account on the operations department social network through social network interface module 334.

Figure 4:
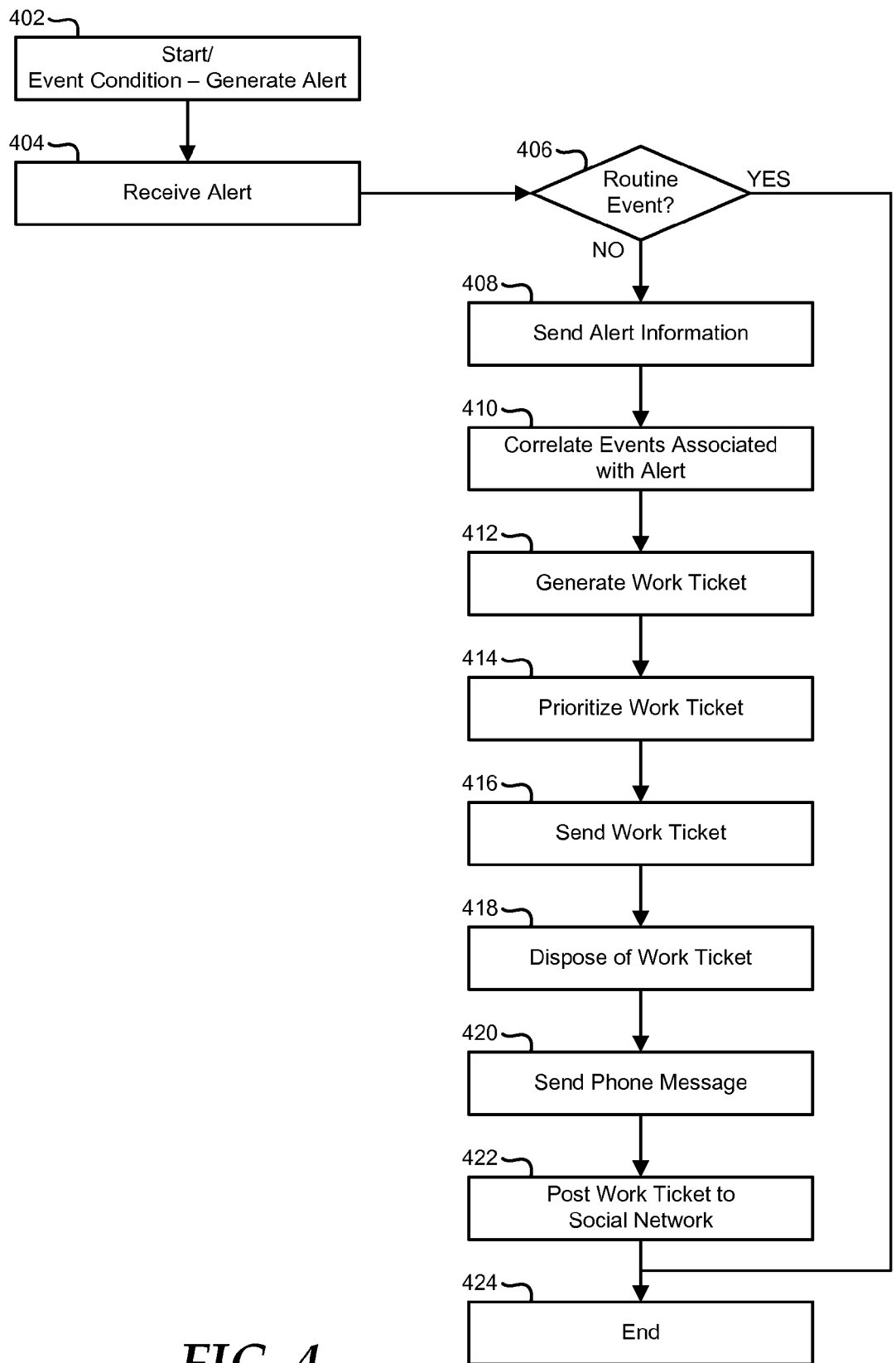
FIG. 4 is a flowchart illustrating a method for alert tracking in an IPTV system.

FIG. 4 is a flow chart illustrating an embodiment of a method for alert tracking in an IPTV system. The method starts in block 402 where an event condition occurs and an alert is generated. For example, a server in provider network 216 can exhibit a high temperature condition, and provider alert module 350 can log the event in an event log. The alert is received in block 404. Thus, alert logger module 310 can send a request for alerts from provider alert module 350 and can receive the alert from provider alert module 350. A decision is made as to whether or not the alert is the result of a routine event in decision block 406. Here, alert logger module 310 can determine whether or not the alert provided by provider alert module 350 constitutes it the result of a routine event and filter out routine alerts while forwarding non-routine alerts to ticketing module 320. If the alert is the result of a routine event, then the "YES" branch of decision block 406 is taken, and the method ends in block 424.

If the alert is not the result of a routine event, the "NO" branch of decision block 406 is taken, and the alert information is sent in block 408. For example, alert logger module 310 can send the alert information to ticking module 320. The alert is correlated with other alerts received to determine if the combination of alerts indicates a different root cause of the event in block 410. For example, ticketing module 320 can apply business rules and the correlation engine to determine the root cause of the event associated with the alert. A work ticket is generated in block 412, the work ticket is prioritized in block 414, and the work ticket is sent in block 416. Thus ticketing module 320 can generate a work ticket based upon the alert information, use the business rules and the correlation engine to determine an urgency of the event that resulted in the alert, prioritize the work ticket based upon the urgency of the event, and send the work ticket to operations module 430.

The work ticket is disposed of in block 418. For example, operations module 330 can determine that a particular operations technician is available to work on the work ticket, and can assign the work ticket to the operations technician. The operations technician can evaluate the work ticket, determine a root cause for the event, and repair the problem at the root cause of the event. A phone message is sent in block 420. Thus operations module 330 can send a text or voice mail message to a mobile device associated with the assigned operations technician through mobile device interface module 332. The work ticket is posted to a social network in block 422, and processing ends in block 424. Here, operations module 330 can post a description of the work ticket to an operations department social network through social network interface module 334, and can send a message to an account on the operations department social network associated with the assigned operations technician.

Figure 5:
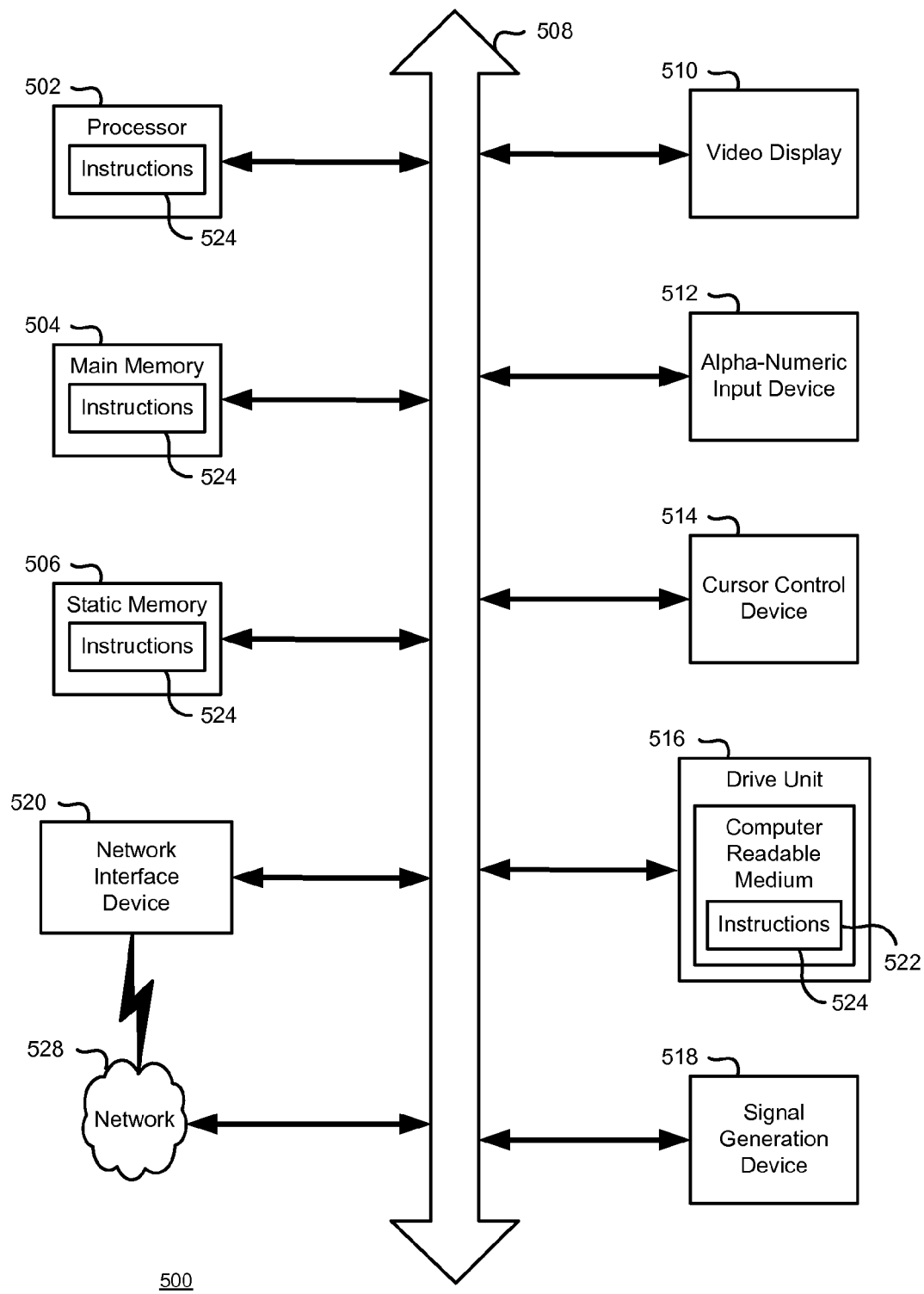
FIG. 5 is a block diagram showing an illustrative embodiment of a general computer system.

FIG. 5 shows an illustrative embodiment of a general computer system 500 in accordance with at least one embodiment of the present disclosure. Computer system 500 includes a set of instructions that can be executed to cause computer system 500 to perform any one or more of the methods or computer based functions disclosed herein. Computer system 500 can operate as a standalone device or can be connected via a network to other computer systems or peripheral devices.

In a networked deployment, computer system 500 operates in the capacity of a server or as a client computer in a server-client network environment, or as a peer computer system in a peer-to-peer (or distributed) network environment. Computer system 500 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 500 is implemented using electronic devices that provide voice, video or data communication. Further, while computer system 500 is illustrated as a single system, the term "system" shall also be taken to include any collection of systems or sub-systems that individually or jointly execute a set, or multiple sets, of instructions to perform one or more computer functions.

Computer system 500 includes a processor 502 such as a central processing unit (CPU), a graphics processing unit (GPU), or both. Moreover, computer system 500 includes a main memory 504 and a static memory 506 that communicate with each other via a bus 508. Computer system 500 further includes a video display unit 510, such as a liquid crystal display (LCD), an organic light emitting diode (OLED), a flat panel display, a solid state display, or a cathode ray tube (CRT). Additionally, computer system 500 includes an input device 512, such as a keyboard, and a cursor control device 514, such as a mouse. Computer system 500 also includes a disk drive unit 516, a signal generation device 518, such as a speaker or remote control, and a network interface device 520.

In a particular embodiment, disk drive unit 516 includes a computer-readable medium 522 in which one or more sets of instructions 524 are embedded. Instructions 524 embody one or more of the methods or logic as described herein. In a particular embodiment, instructions 524 reside completely, or at least partially, within main memory 504, static memory 506, and/or within processor 502 during execution by computer system 500. Main memory 504 and processor 502 also include computer-readable media. Network interface device 520 provides connectivity to a network 526 such as a wide area network (WAN), a local area network (LAN), or other network. The present disclosure contemplates a computer-readable medium that includes instructions 524 or receives and executes instructions 524 responsive to a propagated signal, so that a device connected to network 526 can communicate voice, video or data over network 526. Further, instructions 524 can be transmitted or received by network 526 via network interface device 520.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, or hardware implementations, or a combination thereof.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited

What is claimed is:

1. A method, comprising:
    receiving, by a system comprising a processor, an alert from equipment of a service provider, wherein the alert is directed to an internet protocol television network, and wherein the alert is associated with a fault event occurring at the equipment of the service provider;
    correlating, by the system, the alert with other alerts received by the system to determine whether a root cause of the fault event is related to the equipment of the service provider that generated the alert or other equipment providing services to the equipment of the service provider;
    determining, by the system, an urgency for the fault event according to business rules and a result of correlating the alert with other alerts;
    generating, by the system, a work ticket associated with the alert;
    assigning, by the system, a first priority to the work ticket based upon the urgency for the fault event to generate a prioritized work ticket;
    allocating, by the system, the prioritized work ticket; and
    sending, by the system, to a mobile device a first message regarding the prioritized work ticket;
    posting, by the system, the prioritized work ticket and a description thereof at a social network; and
    sending, by the system, a second message to an account associated with the social network.

2. The method of claim 1, wherein the first message comprises a text message.

3. The method of claim 1, wherein the first message comprises a voice mail message.

4. The method of claim 1, wherein the account is further associated with an operations technician.

5. The method of claim 1, wherein determining the urgency further comprises determining from the result of the correlation that the other equipment providing services to the equipment of the service provider is the root cause of the fault event associated with the equipment of the service provider, and wherein the first priority has a lower priority than a second priority assigned to another work ticketed generated for the other equipment.

6. The method of claim 1, wherein the fault event includes a server fault condition on a server associated with the service provider.

7. The method of claim 1, wherein the fault event includes a fault associated with an application provided by the service provider.

8. A method comprising:
receiving, by a system comprising a processor, an alert from equipment of a service provider, wherein the alert is directed to an internet protocol television network, and wherein the alert is associated with a fault event;
correlating, by the system, the alert with other alerts received by the system to determine whether a root cause of the fault event is related to the equipment of the service provider that generated the alert or other equipment providing services to the equipment of the service provider;
determining, by the system, an urgency for the fault event;
generating a work ticket associated with the alert;
assigning, by the system, a first priority to the work ticket that is lower in priority than a second priority assigned to another work ticket generated for the other equipment to generate a prioritized work ticket;
sending, by the system, the prioritized work ticket to an operations module;
allocating the prioritized work ticket; and
sending, by the system, to a mobile device a first message regarding the prioritized work ticket;
posting, by the system, the prioritized work ticket and a description thereof at a social network; and
sending, by the system, a second message to an account associated with the social network.

9. The method of claim 8, wherein the first message comprises a text message.

10. The method of claim 8, wherein the first message comprises a voice mail message.

11. The method of claim 8, wherein the account is further associated with an operations technician.

12. The method of claim 8, wherein the equipment of the service provider comprises a server associated with the service provider.

13. The method of claim 8, wherein the fault event is associated with an application provided by the equipment of the service provider.

14. Machine-executable code embedded within a tangible device comprising instructions, which responsive to being executed by a processor, cause the processor to perform operations comprising:
receiving an alert from a service provider, wherein the alert is directed to an internet protocol television network, and wherein the alert is associated with a fault event;
determining from a correlation of the alert and other alerts that a root cause of the fault event is related to equipment of the service provider that generated the alert or other equipment providing services to the equipment of the service provider;
determining an urgency for the fault event according to the correlation;
generating a work ticket associated with the alert;
assigning a priority to the work ticket based upon the urgency for the fault event to generate a prioritized work ticket;
allocating the prioritized work ticket; and
sending to a mobile device a message regarding the prioritized work ticket;
posting the prioritized work ticket and a description thereof at a social network; and
sending a message to an account associated with the social network.

15. The machine-executable code of claim 14, wherein the account is further associated with a technician.

16. The machine-executable code of claim 14, wherein the fault event is a server fault condition on a server associated with the equipment of the service provider.

17. The machine-executable code of claim 14, wherein the fault event is a fault associated with an application supplied by the equipment of the service provider.

* * * * *